(12) United States Patent
Fourie et al.

(10) Patent No.: US 10,530,697 B2
(45) Date of Patent: Jan. 7, 2020

(54) INTENT BASED NETWORK CONFIGURATION

(71) Applicant: Futurewei Technologies, Inc., Plano, TX (US)

(72) Inventors: Henry Louis Fourie, Livermore, CA (US); Hong Zhang, Palo Alto, CA (US)

(73) Assignee: Futurewei Technologies, Inc., Plano, TX (US)

( * ) Notice: Subject to any disclaimer, the term of this patent is extended or adjusted under 35 U.S.C. 154(b) by 223 days.

(21) Appl. No.: 15/046,071

(22) Filed: Feb. 17, 2016

(65) Prior Publication Data

US 2016/0241436 A1    Aug. 18, 2016

Related U.S. Application Data

(60) Provisional application No. 62/117,306, filed on Feb. 17, 2015.

(51) Int. Cl.
*H04L 12/851* (2013.01)
*H04L 12/24* (2006.01)

(52) U.S. Cl.
CPC ...... *H04L 47/2425* (2013.01); *H04L 41/0806* (2013.01)

(58) Field of Classification Search
CPC ............. H04L 47/2425; H04L 47/2441; H04L 41/0806; H04L 41/0803

(Continued)

(56) References Cited

U.S. PATENT DOCUMENTS 7,191,229 B2 *  3/2007  Edmondson ............ H04L 47/10
                                                                709/220
9,537,891 B1 *  1/2017  Walter .................... H04L 63/20
                      (Continued)

OTHER PUBLICATIONS

Reich et al., Modular SDN Programming with Pyretic, Oct. 2013, usenix.org, pp. 40-47, https://www.usenix.org/system/files/login/articles/09_reich-online.pdf (Year: 2013).*

(Continued)

*Primary Examiner* — Thomas J Dailey
*Assistant Examiner* — Lam H Duong
(74) *Attorney, Agent, or Firm* — Slater Matsil, LLP

(57) ABSTRACT

An embodiment device includes a network interface, a non-transitory computer readable medium having executable instructions thereon, and a processor coupled to the network interface and the computer readable medium. The executable instructions cause the processor to receive an Intent representing requirements for data traffic on a network having a plurality of endpoints, with the Intent specifying one or more traffic parameters identifying one or more of the endpoints, and and at least one first service. The executable instructions also include instructions to generate one or more networking commands identifying the at least one first service according to the traffic parameters, send the networking commands to one or more network devices on the network and cause the network devices to perform the at least one first service on a first data transmission in response to parameters of the data transmission satisfying the one or more networking commands.

21 Claims, 8 Drawing Sheets

(58) Field of Classification Search
USPC .......................................................... 709/220
See application file for complete search history.

(56) References Cited

U.S. PATENT DOCUMENTS

| | | | | |
|---|---|---|---|---|
| 9,781,004 | B2* | 10/2017 | Danait | H04L 41/142 |
| 2008/0056156 | A1* | 3/2008 | Andrews | H04L 12/66 |
| | | | | 370/254 |
| 2008/0104088 | A1* | 5/2008 | Kuriyama | G06F 16/9032 |
| 2009/0077618 | A1* | 3/2009 | Pearce | H04L 63/0892 |
| | | | | 726/1 |
| 2010/0333165 | A1* | 12/2010 | Basak | H04L 63/0218 |
| | | | | 726/1 |
| 2011/0206052 | A1* | 8/2011 | Tan | H04L 12/4641 |
| | | | | 370/395.53 |
| 2013/0163475 | A1* | 6/2013 | Beliveau | H04L 67/327 |
| | | | | 370/257 |
| 2014/0068364 | A1* | 3/2014 | Selvaraj | G06F 11/3676 |
| | | | | 714/737 |
| 2014/0317684 | A1* | 10/2014 | Porras | H04L 63/20 |
| | | | | 726/1 |
| 2016/0156591 | A1* | 6/2016 | Zhou | H04L 63/0227 |
| | | | | 726/13 |
| 2017/0149836 | A1* | 5/2017 | Walter | H04L 63/20 |
| 2017/0222873 | A1* | 8/2017 | Lee | H04L 12/6418 |

OTHER PUBLICATIONS

ETSI Group Specification, ETSI GS NFV-MAN 001 V1.1.1, "Network Functions Virtualisation (NFV); Management and Orchestration", Network Functions Virtualisation (NFV) ETSI Industry Specification Group (ISG), Dec. 2014, 184 pages.

Open Networking Foundation, "Intent NBI—Definition and Principles", Oct. 2016 OFN TR-523, 20 pages.

Cerroni, W. et al., "Intent-Based Management and Orchestration of Heterogeneous OpenFlow/IoT SDN Domains", DEI—University of Bologna, Italy, Jul. 3-7, 2017, 9 pages.

* cited by examiner

US 10,530,697 B2

INTENT BASED NETWORK CONFIGURATION

This application claims the benefit of U.S. Provisional Application No. 62/117,306, filed on Feb. 17, 2015, which application is hereby incorporated by reference.

TECHNICAL FIELD

The present invention relates to a system and method for networking, and, in particular embodiments, to a system and method for configuring a network based on Intent description.

BACKGROUND

As data is transferred across a data network, various network entities such as routers, servers, switches, gateways, or the like, act on the data transmission to route, secure and process the data. Generally, data transmissions over packet switched networks are addressed using source and destination endpoints. Additionally, network entities may use data transmission parameters to determine whether some routing, processing or other action should be taken on a particular packet.

SUMMARY

An embodiment device includes a network interface configured to communicate with a network having a plurality of endpoints, a non-transitory computer readable medium having executable instructions thereon, and a processor coupled to the network interface and the computer readable medium. The executable instructions, when executed, cause the processor to receive an Intent representing requirements for data traffic on the network, with the Intent specifying one or more traffic parameters identifying one or more endpoints of the plurality of endpoints, and with the Intent further specifying at least one first service to be performed for data traffic satisfying the traffic parameters. The at least one first service is of one or more services registered as being provided by the network. The executable instructions also include instructions to generate one or more networking commands identifying the at least one first service according to the traffic parameters, send the one or more networking commands to one or more network devices on the network and cause the network devices to perform the at least one first service on a first data transmission in response to parameters of the data transmission satisfying the one or more networking commands.

An embodiment method includes receiving an Intent representing requirements for data traffic on a network having a plurality of endpoints, the Intent specifying one or more traffic parameters and one or more endpoints of the plurality of endpoints, the Intent further specifying at least one first service to be performed for data traffic satisfying the traffic parameters, wherein the at least one first service is of one or more services registered as being provided by the network. The method further includes generating one or more networking commands identifying the at least one first service according to the traffic parameters, sending the one or more networking commands to one or more network devices on the network and causing the network devices to perform the at least one first service on a first data transmission in response to parameters of the data transmission satisfying the one or more networking commands.

An embodiment method includes receiving one or more Intent parameters at a client application and sending, by the client application to an Intent server on a network having a plurality of endpoints, a request to create an Intent for processing data flows by network devices on the network, the Intent representing requirements for data traffic on the network. The Intent specifies one or more traffic parameters and further specifies at least one first service to be performed for data traffic satisfying the traffic parameters, and the at least one first service is of one or more services registered as being provided by the network. The method may further include transmitting a data flow to the network devices so that the Intent is applied to the data flow.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
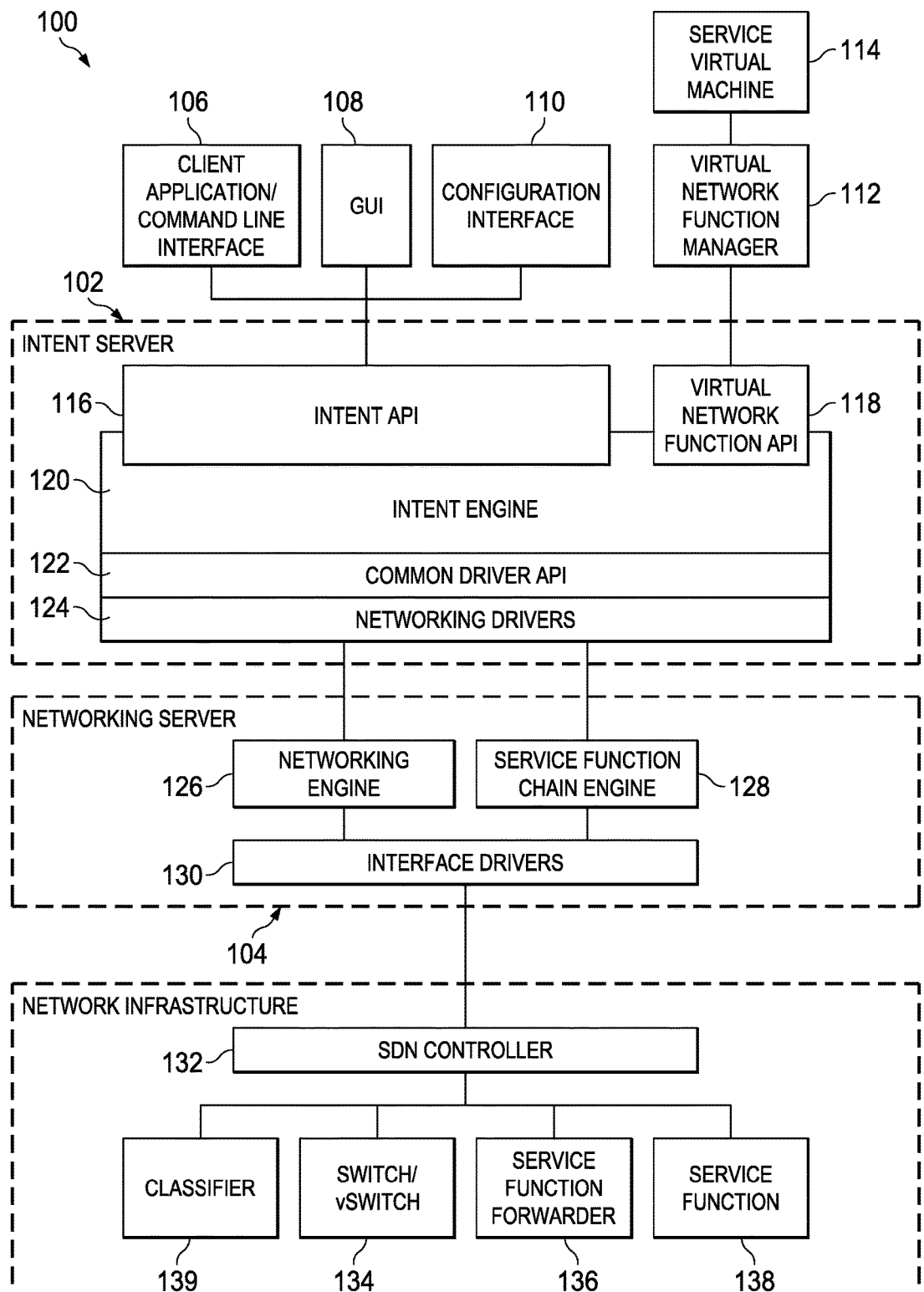
FIG. 1 is a logical diagram illustrating an Intent processing system according to some embodiments.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In some networking environments, certain behaviors are required for different network entities. In order to generally describe network entities such as user groups, business organizations or departments, a statement describing a property of members of network entity may be used to trigger processes or services that should be applied in the network to members of that described network entity. For example, transmissions form a marketing department in New York that are transmitted through an organization's network to an engineering department in San Francisco may be required to pass through a firewall in transit. The rule for causing such transmission to transit a firewall may describe, for example the transmissions to be affected in terms of the source and destinations of the transmissions. Statements describing the grouping of transmission properties can be used to simplify the creation and application of the processes for the transmissions. A network, that provides connectivity services between user endpoints, consists of a dataplane, which transports the actual data packets between the user endpoints, and a control plane which controls the network devices within the dataplane such as switches, routers and service functions. The control plane components include controllers, orchestration engine, service catalogs and similar devices.

Data transiting a particular network element may be analyzed based on properties of the data transmission to determine whether the network element needs to perform some processing on the data flows such as access control, service function chaining, quality of service (QoS) management, logging, transmission steering, and the like. Intents allow applications to specify their requirements for network connectivity to a network infrastructure without prescribing how that service and connectivity are to be realized. An Intent is a way for applications to express their connectivity to a network. The Intents may be rules and associated actions that are applied to data transmissions accessing the network element. The network may have an Intent server, which includes an Intent engine that renders the Intent as a set of network behaviors and functions and then transmits the behaviors and functions to network elements for execution on data transmissions. Applications may apply Intents to various combinations of source endpoints and destination endpoints. An Intent Orchestrator permits realization of the high-level abstract expression of the Intent in terms of actual network resources. The Intent Orchestrator 418 translates the expression of the application's Intent into commands and instructions that are sent to various network resources such as switches, routers and service functions in order to perform the desired Intent.

Endpoint identification generally requires an agreement between client applications and the Intent engine on how endpoint identification is to be expressed. Embodiments provide flexible schemes for identifying endpoints and groups of endpoints to different levels of granularity without being limited to fixed structures using networking and traffic descriptors such as IP prefixes, MAC addresses and TCP ports. The Intents describe endpoints in a way that is flexible and meaningful to applications so that the applications may use named endpoints without needing to describe the specific network elements referencing the endpoints. Typically endpoints have been described in fixed structures with networking and traffic descriptors such as IP prefixes, MAC addresses and TCP ports. It has been determined that Intents can be created by combining these endpoint descriptors in a flexible and granular manner to address a wide variety use cases for network connectivity and services. An Intent may represent requirements for data traffic on a network, and the Intent may specify one or more traffic parameters of at least one service to be performed for data traffic satisfying the traffic parameters. The service may be a service registered as being provided by the network. The Intent may be used to generate networking commands such as flow descriptors identifying the service and one or more endpoints on the network according to the traffic parameters and traffic destination parameters. The networking commands or flow descriptors are sent to network devices on the network and cause the network devices to perform a service on a data transmission at one or more network devices in the network when parameters of the data transmission satisfy the one or more networking commands or flow descriptors.

In some embodiments, a flexible Composite Endpoint Descriptor (CED) may be used to represent groups of user endpoints to which the Intent is to be applied. CEDs provide a scheme for combining endpoint identifier descriptors in a flexible and granular manner to address a wide variety of use cases for network connectivity and services. The CEDs may use administrative identifiers that reflect groupings relevant to end-users and their applications in specific usage domains, e.g., in a marketing department. Thus, the CEDs may use administrative identifiers that are names for network elements, allowing the administrative identifiers to be created and managed without requiring that applications use the specific network element values. For example, a CED may reference an identifier such as "MarketingGroup" instead of listing a specific subnet or IP address mask for the marketing group. Endpoints groups may be created dynamically to address scenarios where Intent must be applied to a specific group of users such as malicious sources of traffic or a group infected with a virus. In an embodiment, the Intent system provides for the translation of Boolean expressions into flow descriptors for controlling flow classifiers in the network infrastructure. This enables service Intents to be deployed in a wide variety of networks, such as data centers, mobile, enterprise and service provider. Additionally, the Intents avoid an application being limited solely to network-centric identification of endpoints, and provide greater flexibility for applying network behaviors and functions.

The CEDs permit an Intent to describe endpoints in a way that is meaningful to applications. For example, a CED may include operators such as Boolean or comparison operators, as well as Flexible Endpoint Descriptors (FEDs) that at least partially identify an endpoint and act as an operand or term in a CED Boolean expression. Thus, an Intent may represent a rule to be applied by a network device, with the Intent describing a set of parameters to identify a group of endpoints for applying a behavior or function. The parameters may be based on properties of a particular data packet or transmission, and are described in one or more CEDs using FEDs, using other CEDs as sub-CEDs or using nested CEDs and FEDs. For example, the parameters may include a source or destination IP or port, or a traffic type, and a particular function may be applied to a type of traffic satisfying the traffic transmitted from, or to, an IP address or port meeting the IP address or port parameters.

The Intent orchestrator presents a high-level abstract Intent API to client applications. The Intent API allows the client applications to describe what the network infrastructure is to do in terms of high level constructs such as the CEDs and a set of operations to be performed on the traffic exchanged between those CEDs. Thus, the client application can describe network actions for particular traffic without specifying details of network topology or how individual devices in the network must be configured.

Intent is applied to groups of users that are meaningful within the usage domains of the client application. For example, a group of users may be a marketing or engineering department within an organization. A CED allows the client applications to group the users (or endpoints) in a manner that is flexible, has variable levels of granularity.

FIG. 1 is a logical diagram illustrating an Intent processing system 100 according to some embodiments. The Intent processing system 100 includes an Intent server 102, and a networking server 104 connected to the Intent server 102. The Intent server 102 and networking server 104 may be deployed together or separately and may each be a plugin, application, process, or other executable code that is deployed across one or more virtual and/or physical servers.

In some embodiments, the Intent server 102 may be a framework on a cloud computing platform such as OpenStack and that is deployed as a networking or infrastructure element. The networking server 104 may be a networking service providing managed networking and extension services such as service function chaining (SFC) and may be deployed, for example, on a cloud computing platform. In some embodiments, the networking server 104 is an OpenStack Neutron server running as part of an OpenStack implementation. In some embodiments, the Intent server 102 is an OpenStack server implemented separately from the networking server 104 that interfaces with the networking server 104 by way of a networking application programming interface (API).

The Intent server 102 has an Intent Engine 120 that exposes an Intent API 116 and a virtual network function (VNF) API 118. The Intent API 116 allows for the definition of a source CED, a destination CED and a set of Operations to be performed. The Intent Operations in some embodiments, include, for example, firewalls, QOS, WAN optimization, HTTP enhancement, service function chaining and logging.

In an embodiment, the Intent API 116 provides web services API such as a representational state transfer (REST) interface for client applications such as a client application/command line interface (CLI) 106, graphical user interface (GUI) 108 and configuration interface 110 to interact with the Intent engine 120 and handle management of the Intents and related components. In some embodiments, the client application/CLI 106 receives text communications from a user, or from another software program such as, for example, a python Intent client that provides python bindings and support for the client application/CLI 106. The GUI 108 provides a graphical interface for interaction by a user to construct Intents, service chains and related elements.

In some embodiments, the client gateway/CLI 106 and GUI 108 each permit a user to enter queries and commands, and then sends those queries or commands to the Intent API 116 to, for example, manage, create, update or access Intents through the Intent engine 120. The client application/CLI 106 and GUI 108 may generate a message that may be a structured text string such as an extensible markup language (XML) message, or a plaintext message, or the like. The configuration interface 110 provides a user or administrator with an interface for configuration of the Intent engine 120 or other elements of the Intent server 102. In some embodiments, the configuration interface 110 is a Heat orchestration engine for OpenStack that permits the launch of management of multiple composite cloud applications.

The Intent Engine 120 handles decoding of Intents, including the CEDs and FEDs associated with each Intent, and translating the Intents and their associated CEDs and FEDS into networking commands that can be applied to networking components in the network infrastructure 140. The Intent may specificy a source endpoint, a destination endpoint and an associated service. In some embodiments, the networking commands may be flow descriptors. In some embodiments, the Intent engine 120 handles API requests incoming from submitting applications and APIs, and manages the database operations for Intents, service chains, CEDs, FEDs, and the like. The Intent engine 120 manages all Intent create/read/update/delete (CRUD) requests from the client applications received through the Intent API 116. In some embodiments, the Intent API 116 is a REST interface that uses an encoding such as JSON or XML.

The Intent engine 120 also provides the VNF API 118, which provides services for registering service functions with the Intent engine 120. A VNF manager 112 manages the life cycle of the VNFs that are hosted on service virtual machine (VMs) 114 or on external devices. The VNFs perform the actual service function treatment on the traffic flows, and can be virtual devices that run on service VMs 114, physical devices, or a combination thereof. The VNF manager 112 registers its active VNF instances with the Intent engine 120 via the VNF API 118. The Intent engine 120 tracks active VNF instances that can be used for the creation of the service chains.

The Intent engine 120 uses a common driver API 122 to communicate with the networking server 104 using appropriate networking drivers 124. For example, the Intent engine 120 may have compatibility for different network infrastructures integrated into the Intent engine 120, and the networking drivers 124, in some embodiments, may be a OpenStack Neutron driver, OpenDaylight (ODL) driver, open network operating system (ONOS) driver, or the like.

The Intent engine 120 uses the interface with the networking server 104 to create and manage networking constructs such as networks, subnets, ports, routers, and the like to implement the Intents requested by the client applications 106, 108 and 110. The Intent engine 120 interacts with a networking engine 126 for example, though an API to manage the resources. In some embodiments, the networking engine is an ml2 plugin and provides connectivity to one or more interface drivers 130 to networking elements in the network infrastructure 140 such as a software defined network (SDN) controller 132, a flow classifier 139, switch or virtual vSwitch 136, service function device 138, or the like. In some embodiments, the interface drivers 130 are virtual switch drivers such as an Open vSwitch (OVS) driver, SDN-controller (SDN-C) driver, ml2 mechanism drivers, ml2 type drivers, and the like.

The networking server 104 may, in some embodiments, have a service function chain (SFC) engine 128. The Intent engine 120 communicates with the service function chain engine 128 to support service function chains that may be part of an Intent requested by the client applications. In some embodiments, the SFC engine 128 is an OpenStack Neutron API. The SFC engine 128 may have a common driver API that allows SFC drivers from different vendors to be integrated into the networking server 104. The common driver API of the SFC engine 128 provides an interface between a service chain manager of the SFC engine 128 and various vendor-specific SFC drivers for SDN controllers 132, classifiers 139, virtual switches 134, service function forwarders 136, and the like.

The SDN controller 132 manages the traffic classification and steering that provided by classifiers of switches, proxy devices, and the like. The SDN controller 132 is responsible for installing flow rules in the classifiers 139, and forwarding rules in the switches to direct different flows to different VNFs. The SDN controller 132 receives the location information of the VNFs from networking server 104.

The SDN controller 132 may control one or more networking devices such as a classifier 139, switch/vSwitch 134, forwarder 136, service function device or the like. Networking devices such as a virtual switch, OVS, switch, router, server or the like may disposed in the network infrastructure 140 and used to handle traffic according to Intent 300 specification. Each networking device 134, 136, 138 and 139 is responsible for forwarding the traffic to their designated local VNFs and for forwarding the traffic to the next hop switch after the local VNF processing. The network devices may use an overlay transport network such as a network virtualization system, for example, virtual extensible LAN (VXLAN) to forward the traffic to its next hop network device in the service domain. In some embodiments, the network devices 134, 136, 138 and 139 can be virtual devices or physical devices.

Figure 2:
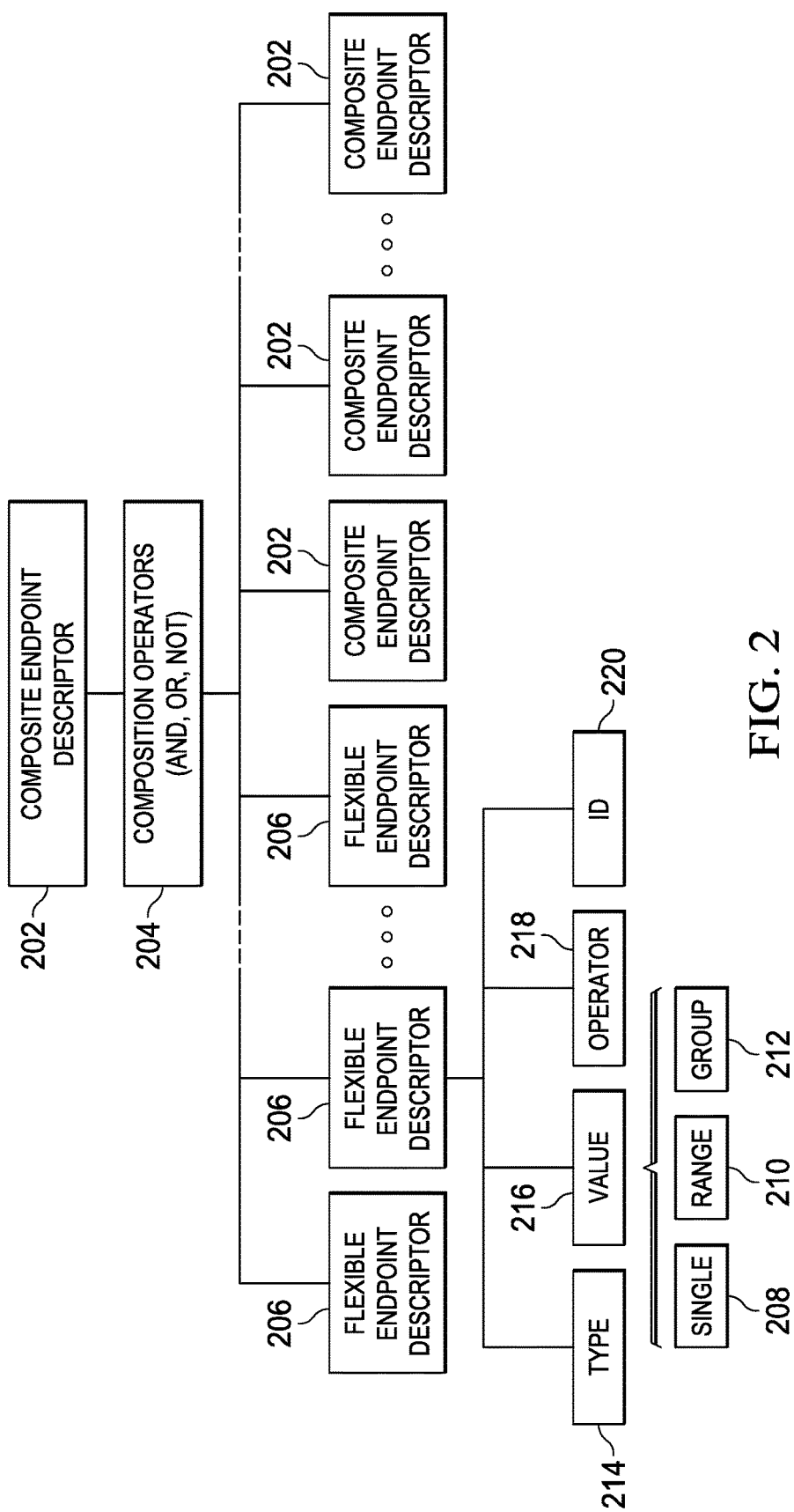
FIG. 2 is a logical diagram illustrating a Composite Endpoint Descriptor of an Intent according to some embodiments.

FIG. 2 is a logical diagram illustrating a Composite Endpoint Descriptor (CED) 202 of an Intent according to some embodiments. The Intent API 116 is based on the Intent model. The Intent model includes one or more CEDs 202. A CED 202 consists of a Boolean expression consisting of one or more operands or terms such as the IDs of registered Flexible Endpoint Descriptors (FEDs) 206 and, in some embodiments, the IDs of other CEDs 202. In cases where the CED 202 has multiple operands, composition operators 204, which may be Boolean operators that include "and", "or", "not", and the like, may be used to connect the multiple operands. The operands are IDs of registered FEDs 206 and/or the IDs of other CEDs 202. In some embodiments, the CED 202 is a plaintext string, ASCII string, a structured text string such as an XML or HTML string, an object, or the like. Additionally, parentheses may be used for the purpose of grouping.

The Boolean operators connect FEDs 206 so that the FEDs 206 are combined to form the CED 202 using various logical composition operators such as and, or, not. Each FED 206 has an ID 220, a type 214 and value 216 that are used to at least partially identify an endpoint. An FED 206, in some embodiments, also has an operator 218 that operates on the value 216, for example, a Boolean or comparison operator such as =, <, >, NOT, or the like. The FED ID 220 is used as an operand (term) in a CED's 202 Boolean expression. The type 214 of the FED 206 may be a base networking identifier, such as Layer 3 IP address, or a user-defined type. The value 216 may a single value 208, a range of values 210, or a group of values 212. The FEDs 206 may have a type 214 that is a predefined type, for example, physical endpoint parameters such as rack, shelf, slot, port, etc. (L1), or a type that related to the transmission parameters of a data transmission such as an L2 MAC address definition (L2-MAC), an L2 FED, an L2 virtual local area network (VLAN) ID or definition (L2-VLAN), an L3 FED, an L3 IPv4 address or prefix definition (L3-IPv4), an L3 IPv6 address or prefix definition (L3-IPv6), an L4 protocol definition (L4-protocol), an TCP/UDP port range definition (L4-port), an L7 URL definition (L7-URL), or may have a type that an application provided type, or another data type.

The Intent API provides an interface for handling requests to create, read, update and delete Intents and related objects such as Intent Operations, source and destination CEDs 202 and service descriptors. The client application and the Intent engine 120 agree on the type and scope of the FEDs 206. The Intent engine 120 may maintain a FED database that contains all the different endpoint types supported by the Intent engine 120. The client application may query this endpoint descriptor database to discover the types of endpoint descriptors that it can use when specifying its Intents. CEDs 202 and FEDs 206 may optionally contain a tenant identifier for use in multi-tenant data center environments. The tenant identifier may be used to identity the owner of the network the which the CEDs 202 and FEDs 206 belong. In an embodiment, the CEDs 202 may be stored in such a database as a database entry with attributes as shown in Table 1, and the FEDs 206 as a database entry with attributes as shown in Table 2.

TABLE 1

CED Attributes

| Attribute | Type | Default Value | Required | CRUD | Description |
|---|---|---|---|---|---|
| id | uuid-str | Generated | N/A | R | UUID of Composite Endpoint |
| tenant_id | uuid-str | Derived from Authentication Token | No | CR | Owner of Composite Endpoint |
| name | String | None | No | CR | Name |
| description | String | None | No | CRU | Description |
| expression | String | N/A | Yes | CRU | Boolean expression of registered endpoint descriptor ids and/or the ids of other composite endpoints. |

TABLE 2

FED Attributes

| Attribute | Type | Default Value | Required | CRUD | Description |
|---|---|---|---|---|---|
| id | uuid-str | Generated | N/A | R | UUID of Endpoint Descriptor |
| tenant_id | uuid-str | Derived from Authentication Token | No | CR | Owner of Endpoint Descriptor |
| name | String | None | No | CR | Unique Name |
| description | String | None | No | CRU | Description |
| type | Enum | None | Yes | CR | Type |
| format | Enum | single-value | Yes | CR | Format: single-value, range, list |
| value | List (dict) | None | Yes | CR | Value |

In some embodiments, there a base set of networking endpoint descriptor types is defined, so that a CED 202 also may reference one or more other CEDs 202. This allows an application to create its own endpoint descriptor types that are meaningful in the application's own application context. These nested or extended application-centric endpoint descriptors are defined in terms of the base endpoint descriptor types. For example a CED 202 may be:

(FED1 or FED2) and not CED22

In some embodiments, each FED 206 has a type, an operator and value that are used to at least partially identify an endpoint. The type defines the attribute for the FED 206, such as a Layer 3 IP address, the operator specifies whether it is an individual value, or a range of values, and the value may be a single value 208, a range of values 210, or a group of values 212 for the attribute. A group may be represented by { . . . }, and a range represented by [x-y].

For example, a CED 202 may include three FEDs 206, where a first FED 206 named FED1 has a type of IP address, an operator of equals and a value that is an IP prefix 120.2.3.0/24, a second FED 206 named FED2 has a type of L4 protocol, an operator of equals and a value of TCP, and a third FED 206 named FED3 has a type of TCP port, operators of with a range of TCP ports 1000-2000.

A CED 202 is created using Boolean composition operators such as: "CED=FED1 and FED2 and not FED3". This represents endpoints with IP prefix 120.2.3.0/24 and TCP ports outside the range 1000-2000. As another example, the FED 206 may represent a group, such as CED=FED1, where IP address FED1={IP1, IP2, . . . IPn}. Thus, a CED and related FEDs may be, for exampleCED=(CED1 or FED1) and FED2 and not FED3)

FED1: type=IP Address, value={IP1, IP2, IP3}
FED2: type=TCP port, value=range [1000-2000]
FED3: type=L7 URL, value="www.google.com"

In some embodiments, the CED 202 also may be used create groups of endpoints. A group of endpoints may include multiple CEDs 202, with each CED 202 describing an endpoint. For example, a group=CED1 and CED2 and CED3.

Figure 3:
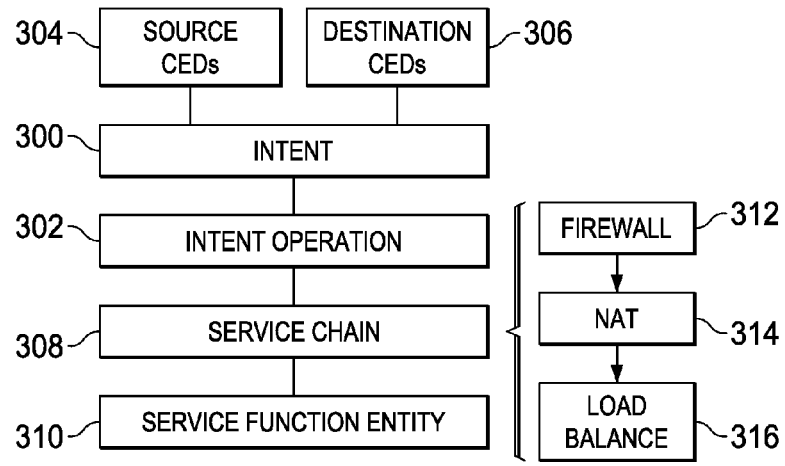
FIG. 3 is a logical diagram illustrating an arrangement of an Intent according to some embodiments.

FIG. 3 is a logical diagram illustrating an arrangement of an Intent 300 according to some embodiments. An application may generate an Intent 300 with a set of CEDs 202, which, in some embodiments, include a set of source CEDs 304 and destination CEDs 306 which are evaluated against the source or destination of a data transmission. In addition, the Intent 300 includes an Operation 302 applied when a data transmission satisfies the logical or Boolean expressions of the CEDs 202. The Operation 302 may, in some embodiments, be a rule, policy, or the like that is applied then the conditions in the CEDs 202 of the Intent 300 are met. The attributes for CEDS 202 and FEDs 206 are shown in Tables 1 and 2, respectively.

In some embodiments, the Intent 300 has an Intent Operation 302 applied to a group of source CEDs 304 and a group of destination CEDS 306. For example, the Intent 300 may have only a source CED 304 or a destination CED 306. In some embodiments, the Intents 300 and related elements such as CEDs 202, FEDs 206 and the like are stored in a searchable data structure such as a database, file, search tree, or the like. In some embodiments, the Intent engine 120 may store the Intents 300 in a database as database entries for query with attributes as shown in Table 3, and the Operations 302 as database entries with attributes as shown in Table 4.

TABLE 3

Intent Attributes

| Attribute | Type | Default Value | Required | CRUD | Description |
|---|---|---|---|---|---|
| id | uuid-str | Generated by database | N/A | R | UUID of Intent |
| tenant_id | uuid-str | From Auth Token | No | CR | Owner of Intent |
| name | String | None | No | CR | Name |
| description | String | None | No | CRU | Description |
| src_composite_endpoint | uuid-str | N/A | Yes | CRU | Source Composite Endpoint |
| dst_composite_endpoint | uuid-str | N/A | Yes | CRU | Destination Composite Endpoint |
| Intent_operations | List (uuid-str) | N/A | Yes | CRU | List of Intent Operations |

TABLE 4

Operation Attributes

| Attribute | Type | Default Value | Required | CRUD | Description |
|---|---|---|---|---|---|
| id | uuid-str | Generated | N/A | R | UUID of Operation |
| tenant_id | uuid-str | From Auth Token | No | CR | Owner of Operation |
| name | String | None | No | CRU | Name |
| description | String | None | No | CR | Description |
| type | String | N/A | Yes | CR | Operation type: service_chain, access, inspect, qos, log |
| value | uuid-str | N/A | Yes | CR | Operation-specific value. |

The Intents 300 are evaluated by the Intent engine 120 and then converted into flow descriptors that are transmitted to network devices for application to data transmissions or data flows. In some embodiments, multiple Intents 300 may be linked or related, or flow descriptors may be generated from multiple Intents 300. In some embodiments, the CEDs 202, FEDs 206 and Operations 302 are stored in a database until they are referenced by an Intent 300, then they are copied for evaluation and conversion into the flow descriptors.

The Operation 302 is applied to the traffic that matches the source CEDs 304 and the destination CEDS 306. In some embodiments, an Operation 302 is, for example, an access control (ACL) operation, a QoS operation, a Firewall service, etc., or may refer to an ordered sequence of services, such as a service chain 308. The service chain 308, in some embodiments, has an ordered list of service function entities 310. The service function entity 310 is an abstract representation of a service function, and is an element in a service chain 308, which may, for example, include a chain of services such as a firewall service 312, a network address translation service 314 and a load balancing service 316.

Requests to create or register the service functions are handled through the VNF API 118, and the service function entities 310 may refer to the registered service functions. The Intent engine 120 may store the service chains 308 and service function entities 310 in a database.

In addition, a client may dynamically compose new endpoint descriptors and register them with the Intent engine 120. The client application may then use any of registered endpoint descriptor types when it creates Intents 300. This allows client applications to extend the base set of network oriented endpoint descriptors to application-centric endpoint descriptors.

Figure 4:
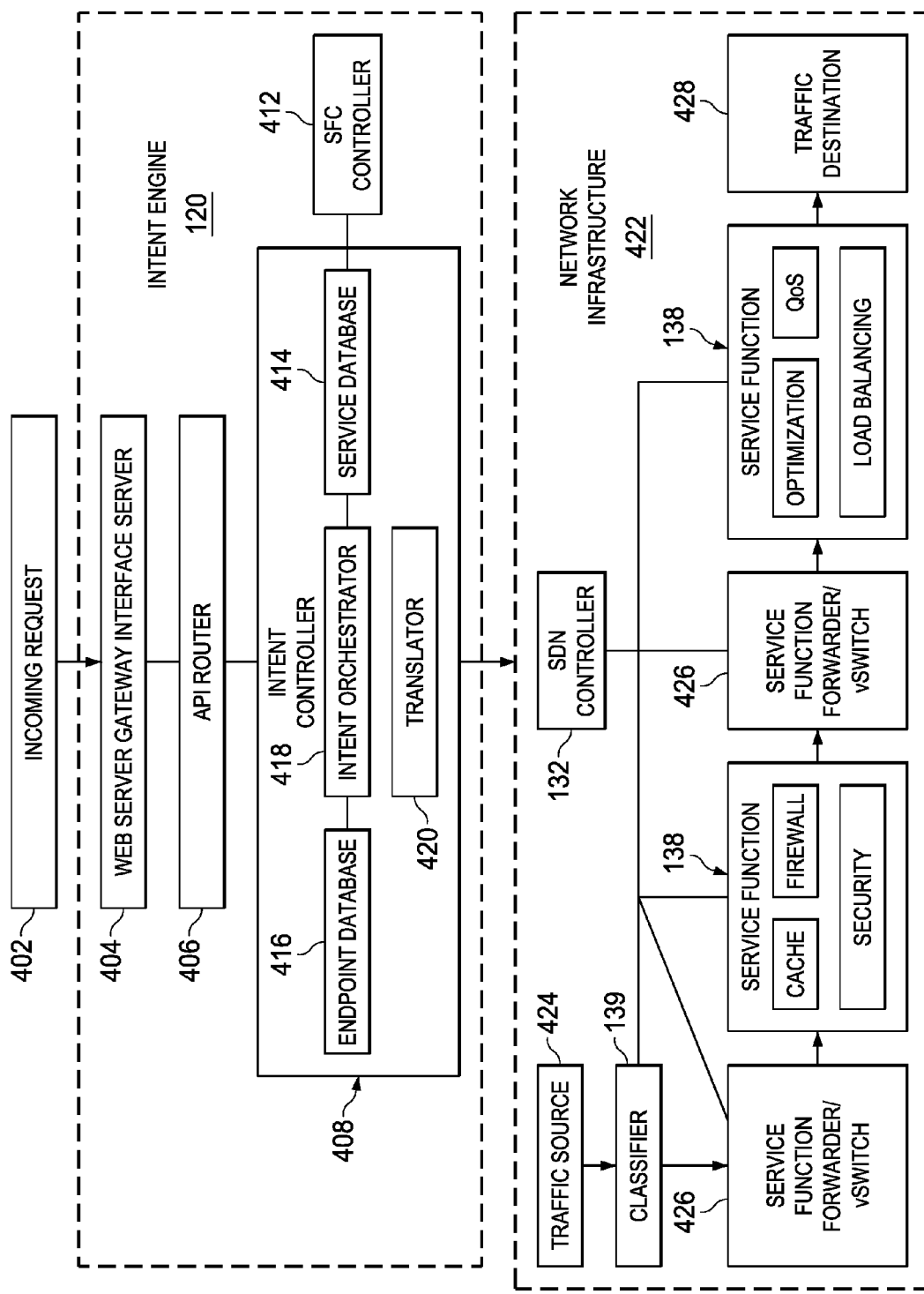
FIG. 4 is a logical diagram illustrating the Intent engine according to some embodiments.

FIG. 4 is a logical diagram illustrating the Intent engine 120 according to some embodiments. The Intent engine 120 manages all Intent processing and CRUD requests from the client applications. In an embodiment, the Intent API 116 may be based on a REST API where the API requests are encoded as HTTP requests sent from the client application to the Intent Orchestrator 418. The Intent Orchestrator 418 sends HTTP responses back to the client application to indicate the success or failure of the desired operations. The Intent API 116 receives incoming REST requests 402 such as hypertext transport protocol (HTTP) REST requests from the client applications 106, 108 and 110. In such an embodiment, the requests may use HTTP methods such as GET, POST, PUT, and DELETE.

In an embodiment, an Intent is received, with the Intent representing requirements for data traffic on the network. The Intent specifies one or more traffic parameters and at least one service. The service will be performed for data traffic satisfying the traffic parameters. The service is registered as being provided by the network. In an embodiment, the traffic parameters are CEDs having one or more FED identifiers of one or more FEDs that at least partially identify an endpoint.

The incoming requests 402 are passed to an interface of the Intent engine 120 such as a Web Server Gateway Interface (WSGI) Server 404. The WSGI Server 404 passes the requests to an APIRouter 406 for dispatch to an Intent Controller 408 or the like for processing. The Intent must are translated into a form that can be used to control devices in the network infrastructure. The CEDs 202 are translated into end-to-end flow descriptors than can be used to control traffic classifiers for the selection of traffic in the data-plane. The Intent Operation definitions are translated into sequences of service device instances that are applied to the traffic in the data-plane. The Intent Operations are translated into flow switching information that be applied to switches and routers in the network infrastructure.

An Intent orchestrator 418 may create or manage the Intents 300, and handle creation or management of the CEDs 202 and FEDs 206, saving Intents 300, CEDs 202, and FEDs 206 to one or more endpoint databases 416. In some embodiments, the endpoint databases 416 include multiple databases such as a separate Intent database, CED database and FED database. In other embodiments, the Intents 300, CEDs 202 and FEDs 206 may be stored in, for example, different tables, data structures or portions of a same shared database. The SFC controller 412 may handle creation and management of the service function entities 310 and SFCs 308, by saving or accessing service function entities 310 and SFC 308 definitions in separated or shared databases. Thus, the Intent orchestrator 418 manages the Intent, CED and FED databases and manages the service catalog including the creation, update and deletion of service descriptors in the service database 414.

The Intent orchestrator 418, in some embodiments, also validates the CRUD requests and updates the databases for Intents 300, CEDs 202, and FEDs 206. In some embodiments, the Intent orchestrator 418 verifies that the CRUD requests are valid by, for example, ensuring that requests to update or read elements are made for elements that already exist, that duplicate entries are avoided, that requests to create new elements are logically valid, that new elements such as CEDs 202 and FEDs 206 that reference other elements comprise valid references, and the like.

In an embodiment, the Intent orchestrator 418 generates one or more networking commands for controlling networking devices in the networking infrastructure 422. In some embodiments, the generated networking commands are end-to-end flow descriptors 506, which are installed as rules on network devices on the network and are thus used to select the traffic to which the Intent Operations are to be applied. In an embodiment where the Intent uses CEDs 206 as the traffic parameters, the Intent orchestrator 418 translates CEDs 202 and FEDs 206 into flow descriptors 506 for the desired Intents 300 and performs flow descriptor conflict detection, reporting and resolution. Additionally, the Intent orchestrator 418 uses a translator 420 to translate the flow descriptors to networking infrastructure resources to support the desired Intent 300. These infrastructure resources include, in some embodiments, one or more of flow classifiers 139, service function forwarders and switches 426, routers, network service devices, and the like.

The Intent orchestrator 418 sends the one or more flow descriptors to one or more network devices in the network infrastructure 422. The network devices perform the service on a data transmission when parameters of the data transmission satisfy the flow descriptors. For example, when parameters such as the source IP address and destination IP address of a transmission transiting a classifier 139 match the parameters of the flow descriptor, then the transmission is steered to a device hosting or associated with, for example, a firewall service. Thus, for example, traffic from IP addresses outside of a local network that are intended for user computers in a particular department may be sent through the firewall.

In some embodiments, a network infrastructure 422 provides a dataplane for carrying user traffic. The network infrastructure 422 may at least partly be an SDN and provide an SDN-based dataplane. The network infrastructure 422 handles traffic, and based on the flow descriptors generated from the Intent 300, applies service functions identified in the Intent 300 to traffic meeting the parameters of the flow descriptors. In some embodiments, the network infrastructure 422 may have an SDN controller 132 managing elements in the network infrastructure 422. The Intent orchestrator 418 sends the flow descriptors to appropriate flow classifiers 139 based on the mappings of the flow descriptors to the network resources. Traffic being transmitted from a traffic source 424 to a traffic destination 428 that transits the classifier 139 and triggers the appropriate flow descriptors is processed by, for example, steering the traffic to a service function 138 associated with the flow descriptor. The service function forwarder or vSwitch 426 causes the traffic to be forwarded to the service function 138. In some embodiments, the flow classifier 139 causes the traffic to be forwarded through multiple service functions 138, and may use multiple service function forwarders or vSwitches 426. The service functions may be servers, processes, virtual machines, network devices, or the like for performing functions such as, for example, caching, firewall operations, security such as intrusion detection, network optimization such as WAN optimization, Quality of service management load balancing and the like. The data transmission is then sent on to its destination 428.

Figure 5A:
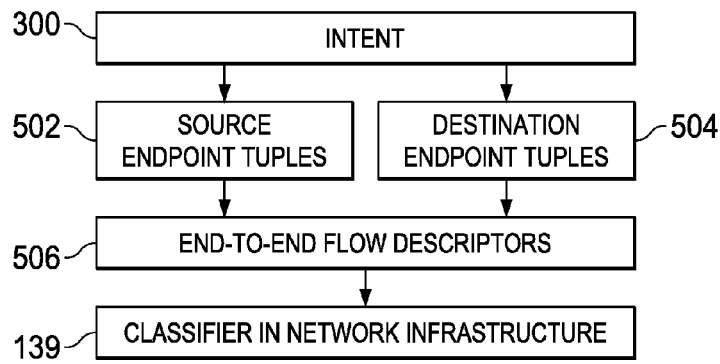
FIG. 5A is a flow diagram illustrating the processing of an Intent into flow descriptors according to some embodiments.

FIG. 5A is a flow diagram illustrating the processing of an Intent 300 into flow descriptors 506 according to some embodiments. In some embodiments, the Intent engine 120 generates flow descriptors 506 and detects, reports, and resolves conflicts in the flow descriptors. For example, in an embodiment, the Intent orchestrator 418 analyzes the Boolean expression associated with a CED 202 by translating the elements in the Boolean expression into an end-to-end flow descriptor 506 based on one or more tuples 502 and 504, or lists of flow rules that can be used to program classifier devices in the data-plane.

In an embodiment, the Intent controller 408 or Intent orchestrator 418 converts an infix Boolean expression from each CED 202 of an Intent 300 into a binary parse tree. Thus, source endpoint tuples 502 and destination endpoint tuples 504 are generated from the source CED 304 and destination CED 306, respectively. In an embodiment, the binary parse tree is generated by converting the Boolean expression to a reverse polish notation (RPN) expression, for example, using a shunting yard algorithm, and then converts the RPN expression to the binary parse tree consisting of operator nodes and operand nodes. A set of tuples 502 and 504 that represent this binary parse tree is created by traversing the binary parse tree in a depth-first, pre-order manner. In such a process, each node in the parse tree determines how the tuples 502 and 504 are generated. In some embodiments, a flow descriptor 506 is created from each source tuple 502 and destination tuple 504 pair. If there are N source tuples and M destination tuples then N×M end-to-end flow descriptors are created for a particular CED. In some embodiments, if a tuple 502 and 504 does not have an IP_ADDRESS descriptor it is excluded from the processing.

In some embodiments, the tuples 502 and 504 are validated. For example, in a case where an AND operator includes two like operands with different values, the Boolean expression must be detected and rejected. The source endpoint tuples 502 and destination endpoint tuples 504 are then merged to form end-to-end flow descriptors 506, which are used by the interface drivers 130 to configure flow classifiers 139 in the network infrastructure. Packets that match these end-to-end flow descriptors 516 will trigger the operations associated with the Intent 300. The flow descriptors 506 describe the classification rules for a single flow. Flow descriptors 506 may have attributes defining one or more attributes such as a flow identifier, Ethernet type (any or single), Ethernet protocol value, source/destination MAC address and address type, VLAN identifier or priority, source/destination IP address type (any, single, range, prefix), IP address, IP address, network mask or prefix length, source/destination port type (any, single, range), source/destination start or end port number, IP differentiated services code point (DSCP), IP Explicit Congestion Notification (ECN), or the like. Packets that match the end-to-end flow descriptors will trigger the operations associated with the Intent 300 when the packets are detected by the network device implementing flow descriptors describing the Intents.

Validating the tuples for the CED 202 avoids contradictory elements in a Boolean expression that would prevent a packet from matching the different descriptors. For example, no packet will match a source CED 202 that has descriptor D1, type=IP_ADDRESS and value=10.1.2.3 in an AND-relationship with descriptor D2, type=IP_ADDRESS and value=22.3.4.34. This is because the packet cannot have two different source IP addresses. This applies to all types of descriptors, including port (L4_PORT), MAC address, IP protocol, and the like. If such a condition is detected, an error is reported.

The end-to-end flow descriptors created by the translation processing are used by the networking drivers 124 of the Intent engine 120 to configure network infrastructure. The common driver API 122 interfaces between the Intent engine 120 and networking drivers 124 for different infrastructures, which in some embodiments, are OpenStack Neutron drivers, the ODL SDN drivers or ONOS SDN drivers. An Intent 300 may reference a set of source CEDs 304 and a group of destination CEDs 306. These source and destination CEDs comprise the CEDs 202. The CED 202 has a list of FEDs 206 and sub-CEDs 202. Thus, CEDs 202 can be nested.

The Intent flows are mapped to networking APIs to render network and service chaining constructs. The networking drivers 124 of the Intent engine 120 map source/destination CED flow descriptors to one or more port, network, subnet, router, flow-filter resources, or the like in the networking engine 126.

Figure 5B:
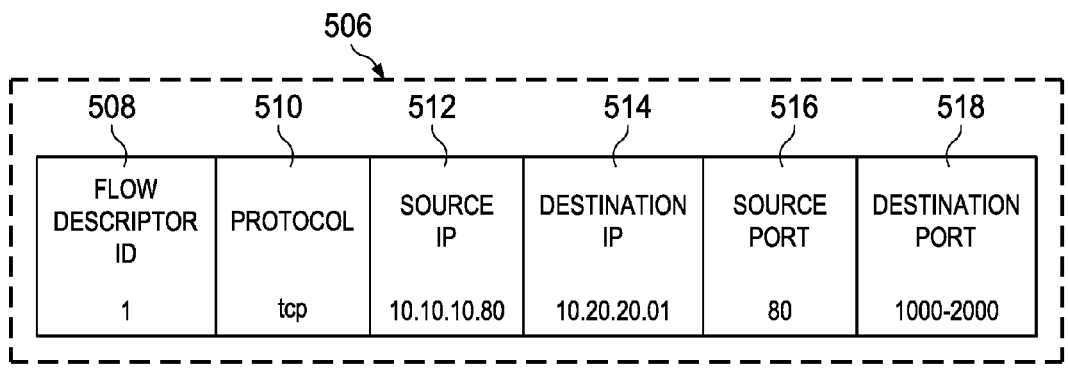
FIG. 5B is a logical diagram illustrating an end-to-end flow descriptor structure according to some embodiments.

FIG. 5B is a logical diagram illustrating an end-to-end flow descriptor structure according to some embodiments. In some embodiments, the flow descriptor has a flow descriptor ID 508 that identifies the particular flow descriptor. In some embodiments, the flow descriptor ID 508 may be omitted, for example, when the flow descriptor is transmitted to a flow classifier 139. In such an example, the flow classifier 139 may assign the flow descriptor ID 508 when the flow descriptor is loaded into the flow classifier 139. The flow descriptor may further have one or more parameters such as a protocol 510, source IP address 512, destination IP address 514, a source port 516, and a destination port 518. In some embodiments, the IP address parameters 512 and 514 may be single IP address, a list of IP addresses, a range of IP addresses, a subnet or mask that identifies a group of IP addresses, or another value identifying one or more IP addresses. The port parameters 516 and 518 may be a single port, a list of ports, a range of ports, or another value identifying one or more ports.

Figure 5C:
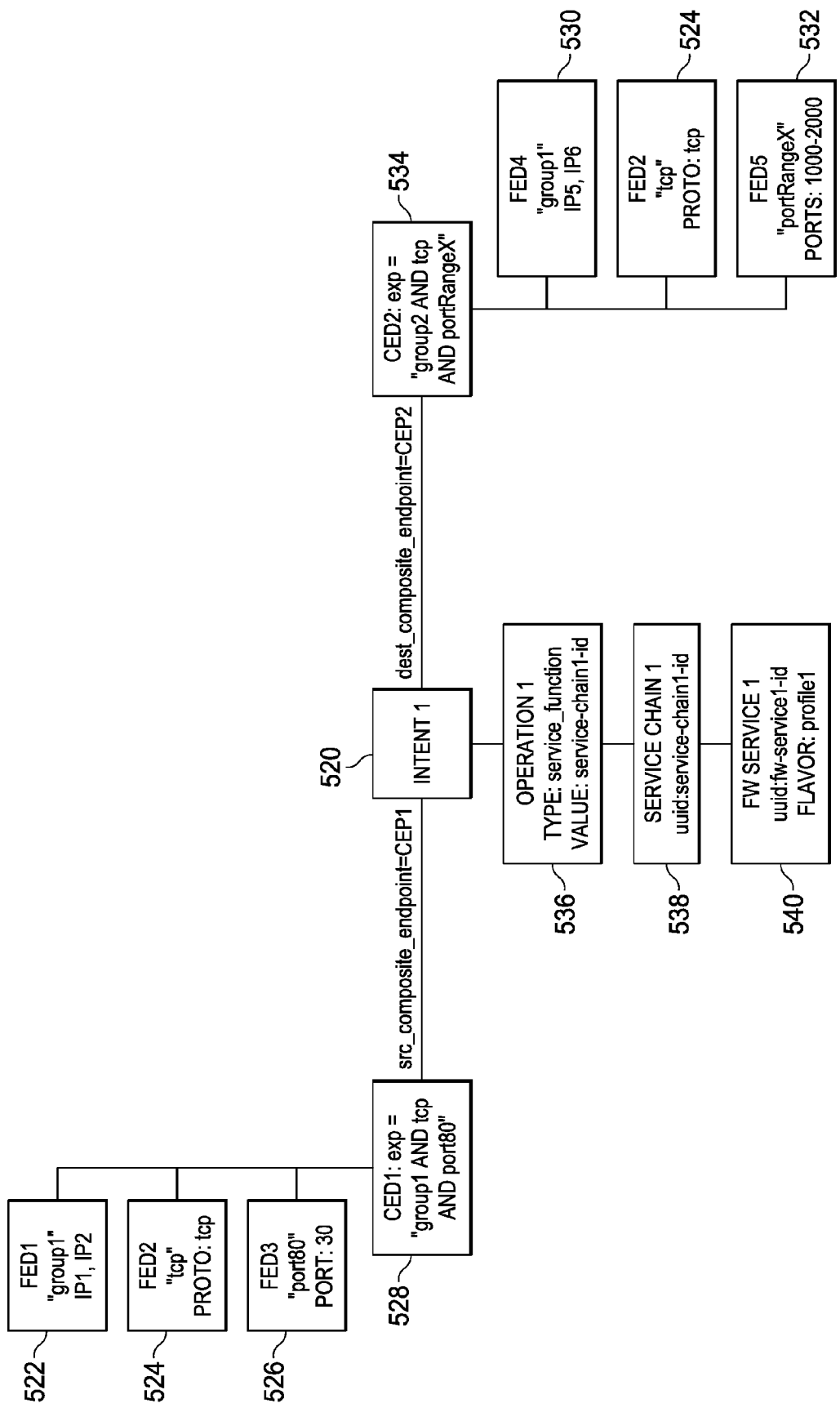
FIG. 5C is a flow diagram illustrating an example of a process for creating an Intent 520 according to some embodiments.

FIG. 5C is a flow diagram illustrating an example of a process for creating an Intent 520 according to some embodiments. In this example, an Intent 520 is created to cause a communications between a selected group of source IP addresses and destination IP addresses to be steered through a firewall. The stated high level goal of the Intent 520 is that "All traffic from Composite Endpoint1 to Composite Endpoint2 must traverse a Firewall." Composite Endpoint 1 (CED1) 528 has a set of IP endpoints at TCP port 80. Composite Endpoint 2 (CED2) 534 has a set of IP endpoints at TCP port range 1000-2000". The client application creates Intent 1 520 with redirect Operation 1 536 that specifies a Service Chain 1 538 with a Firewall service 540. The redirect operation instructs the network to redirect traffic to a particular service having a firewall service. In some embodiments, the service chain identifies multiple services and may also specify an order for performing the services. Intent 1 520 also has a source CED=CED1 528 and destination CED=CED2 534.

Flexible Endpoint Descriptors (FED1-5) 522, 524, 526, 530, 532 have ids: "group1", "group2", "tcp", "port80" and "portRangeX". Composite Endpoint CED1 has the expression: "group1 and tcp and port80", and Composite Endpoint CED2 has the expression: "group2 and tcp and portRangeX".

In some embodiments, the Intents and elements used in the Intent 520 are created through the CLI 106 by, for example, a user entering data or Intent parameters, by an application submitting commands or requests, or the like. An example of CLI commands to create an Intent through an Intent server 102 and its associated service chain 538 with a Firewall service VM 540 may be as shown below. In such an example, Intent parameters such as IP addresses, port ranges, and the like, or CED, FED, service chain or service function identifiers may be entered by the user and translated into a particular command compatible with the Intent API.

Service and Service Chain Creation

1. Create each service function 540 such as a firewall service that is to be used in the service chains 538 using a service-function-create command.

neutron service-function-create-type "firewall" -flavor "profile1" <service-function-name>

2. Create a service chain 538 with a list of service functions 540.

neutron service-chain-create-functions [service-function-name] <service-chain-name>

Intent Creation

1. Create FEDs FED1-FED3 522, 524, 526 with names "group1", "tcp" and "port80".

--- neutron endpoint-descriptor-create --name "group1" --ip_address "10.2.1.1/32"
--ip_address "10.2.1.2/32"
neutron endpoint-descriptor-create --name "tcp" --ip_protocol "tcp"
neutron endpoint-descriptor-create --name "port80" --port_range "min:80, max:80"

2. Create FEDs FED4-FED5 530, 532 with names "group2" and "portRangeX".

```
neutron endpoint-descriptor-create --name "group2" --ip-address
"22.1.8.5/32"
--ip_address "22.1.8.6/32"
neutron endpoint-descriptor-create --name "portRangeX" --port_range
"min:1000, max:2000"
```

3. Create Composite Endpoints CED1 528 and CED2 534 with Boolean expressions that use FEDs FED1-FED5 522, 524, 526, 530, 532.

```
neutron composite-endpoint-create --expression "group1 and tcp and
port80"
neutron composite-endpoint-create --expression "group2 and tcp and
portRangeX"
```

4. Create Service Chain Operation 1 536 to use Service Chain 1 538.

```
neutron Intent-operation-create --type "service-chain"
    --value <service-chain1-uuid>
```

5. Create Intent 1 520 with Intent Operation 1 536 and source Composite End point CED1 528 and destination Composite Endpoint CED2 534.

```
neutron Intent-create --Intent_operations <operation1-uuid>
--src_composite_endpoint <CEP1-uuid> --dst_composite_endpoint
<CEP2-uuid>
```

The Intent Engine 120 will use this Intent 520 specification to create the examples of end-to-end flow descriptors shown in Table 5. These are flow matching rules which the Intent Engine 120 will install on flow classifier devices 139 in the network infrastructure 140 so that traffic meeting the parameters of a flow classifier is steered to devices in the network infrastructure 140 for application of the service associated with the flow descriptor.

TABLE 5

| Flow Descriptor | Protocol | Source IP | Destination IP | Source Port | Destination Port |
|---|---|---|---|---|---|
| 1 | tcp | IP1 | IP5 | 80 | 1000-2000 |
| 2 | tcp | IP1 | IP6 | 80 | 1000-2000 |
| 3 | tcp | IP2 | IP5 | 80 | 1000-2000 |
| 4 | tcp | IP2 | IP6 | 80 | 1000-2000 |

For example, a TCP data flow from Port 80 of IP1 to any port between ports 1000-2000 of IP 6 will meet the parameters of flow descriptor 2. Thus, the flow descriptor device will steer that traffic to a network device handling the service or service chain associated with flow descriptor 2.

Figure 6A:
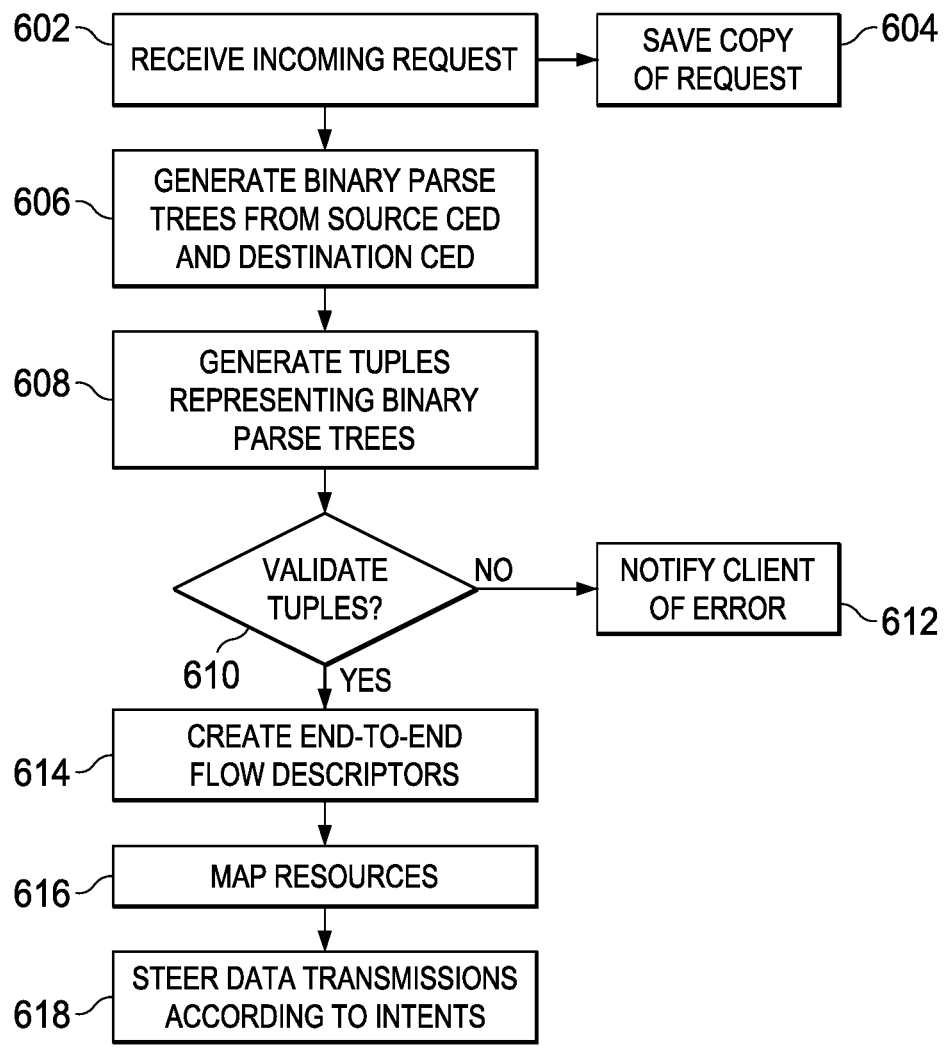
FIG. 6A is a flow diagram illustrating a method for processing Intents according to some embodiments.

FIG. 6A is a flow diagram illustrating a method for processing Intents 300 according to some embodiments. In block 602, the Intent engine receives incoming requests from client applications to create, read, update, and delete Intents, CEDs and Operations, or service chains. The Intent engine saves a copy of the incoming request to a database in block 604 for later reference regarding Intent conflict resolution, modification, updating or other management. In block 606, for requests related to Intents, CEDs, FEDs, or the like, the Intent engine generates binary parse trees from a source CED and a destination CED. In some embodiments, the Boolean expressions of the CEDs are text strings and are converted into RPN expressions, and then into binary parse trees consisting of operator nodes and operand nodes. In block 608, a set of tuples that represent this binary parse tree is created by traversing the binary parse tree in a depth-first, pre-order manner. In such a process, each node in the parse tree determines how the tuples are generated. In block 610, the tuples are validated, and when one or more of the tuples fail validation, the Intent engine notifies the client of an error in block 612. In other embodiments, requests to create FEDs, CEDs, SFCs, service function entities or the like are validated to ensure that valid values are identified as being part of the request, and that the request is logically consistent. For example, requests to create FEDs identifying ports or IP addresses with invalid values may be rejected. In another example, a request to create a CED having a Boolean operands and values that are mutually exclusive may be rejected.

When the tuples pass validation in block 610, end-to-end flow descriptors are generated in block 614. The Intent engine transmits the flow descriptors to flow classifiers residing on network devices using the networking drivers in the Intent engine and the networking server. The Intent engine transmits the flow descriptors through the networking server 104 to one or more networking devices such as SDN controllers, switches, virtual switches and 138, or the like. The networking devices use the flow descriptors to create entries in flow classifier tables. For example, flow classifiers are a component of an OpenFlow switch. Each flow, or row, in the flow table contains a flow classifier. The first flow whose flow classifier matches a packet becomes the active flow entry for that packet. The flow entry also contains an action set which will be applied to all packets matched. A classifier is a sequence of partial or full field match elements from various protocols, and may be based on the CEDs or flow descriptor generated from an Intent. In block 616, the Intent engine maps resources for the Intent. The networking drivers perform mapping of Intent flows to APIs in the networking server 104 to render network and service chaining constructs. For example, the Intent engine may send new flow descriptors/classifiers to a driver, for use in a switch for new service function chains, new Intents, or the like. In block 618, data is transmitted through the devices having the flow descriptors where the flows are analyzed against the flow classifiers. The networking devices apply the Operation associated with a flow descriptor to process the data traffic by, for example, steering the data traffic to an appropriate content source or device for performing functions such as, for example, caching, firewall operations, security such as intrusion detection, network optimization such as WAN optimization, quality of service, management load balancing and the like. In some embodiments, the traffic steering moves the data flow to a particular device without modifying the underlying packets in the data flow.

Figure 6B:
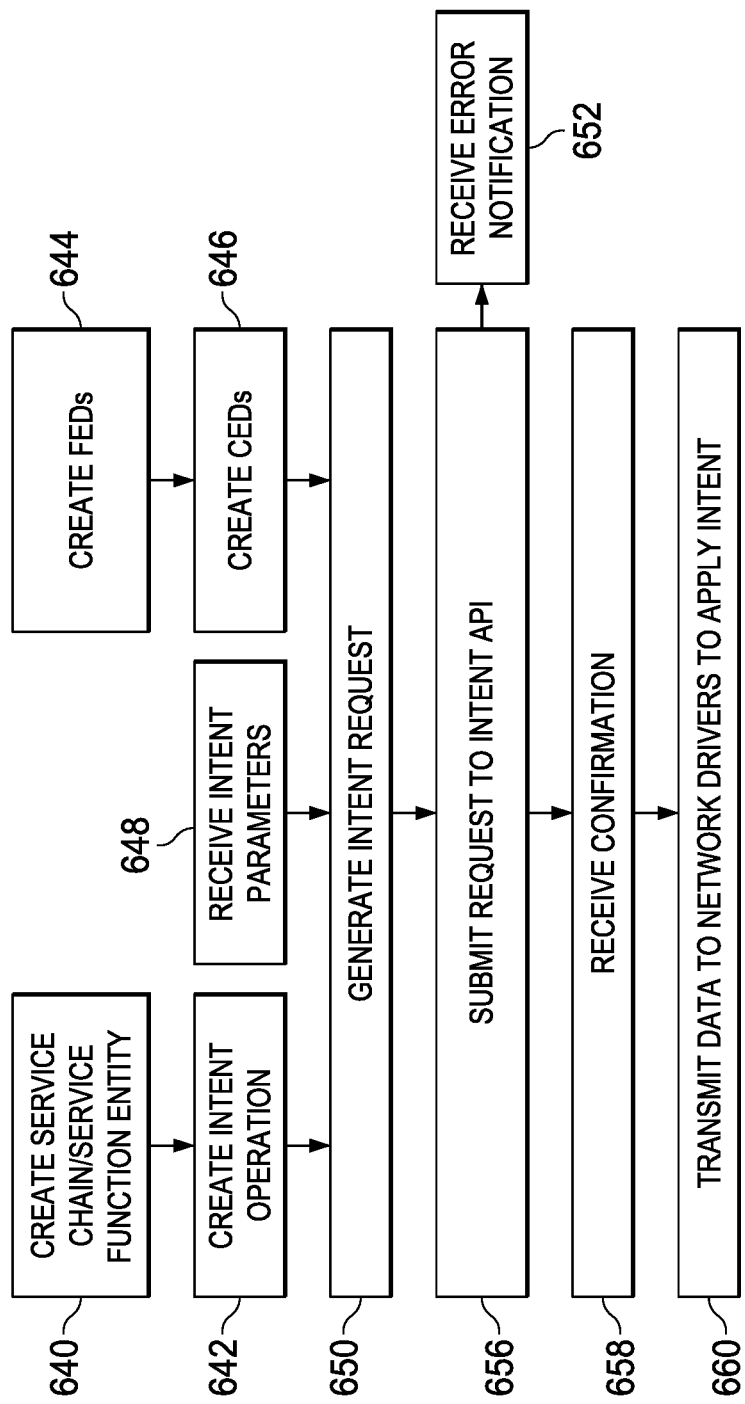
FIG. 6B is a flow diagram illustrating a method for creating Intents according to some embodiments.

FIG. 6B is a flow diagram illustrating a method for creating Intents according to some embodiments. In block 644, a user, application, interface, or the like creates one or more FEDs through the Intent engine. One or more CEDs 202 are created in block 646 using previously created FEDs. In some embodiments, one or more service function entities are created, and a service chain or SFC is created from previously created service function entities through the Intent engine in block 640. In block 642, an Intent Operation is created. In some embodiments, one or more Intent parameters are received in block 648 at a client application such the CLI 106 or GUI 108. In some embodiments, the Intent parameters are identifiers for CEDs, FEDs and Operations that were previously created. In block 650, the client application generates an Intent request using one or more of the previously created CEDs, Intent Operations, service chains and the Intent parameters. In some embodiments, the Intent request is a message carrying Intent parameters entered by the user, by generated by an application, by a client, or the like. The request is submitted or sent to the Intent API 116 of the Intent server 102. The Intent engine 120 performs validation, and upon validation, sends a confirmation that is received by a user in block 658. If the Intent engine 120 fails to validate the Intent request, the Intent engine 120 generates an error notification that is received by the user in block 652. In block 660, after validation of the Intent request, the Intent engine transmits the flow descriptors corresponding to the Intent request to network devices implementing flow classifiers, and then data that is transmitted through the flow classifiers will be analyzed for steering or processing according to the Intent.

The above described methods can be used multiple times to create an Intent that, for example, causes select traffic to traverse a firewall. In such an example, a Firewall service VM will initially be created and registered using the VNF API. A service chain may be created by first creating each service function that to be used in the SFCs, and an SFC referencing the service functions may be created through the SFC engine by requesting, through the Intent API that the networking engine create the SFC and related service function entities. Names or IDs of the service function entities and the SFC may be assigned for later reference by other elements of the Intent. The FEDs may be created, and then source and destination CEDs may be created using the FEDs. An Operation referencing the SFC service chain may be created. An Operation in the Intent specifies the action to be performed on the traffic that flows between the source CEDs and destination CEDs, and may reference a number of different actions including an SFC, logging, denying or blocking traffic, shaping traffic, and the like.

An Intent may then be created using the SFC, operation, the source CED and the destination CED. The creation of the Intent causes the Intent server 102 to generate the flow descriptors and transmit or propagate the flow descriptors to network device flow classifiers for steering of subsequent data flow to the source chain implementing the firewall.

Figure 7:
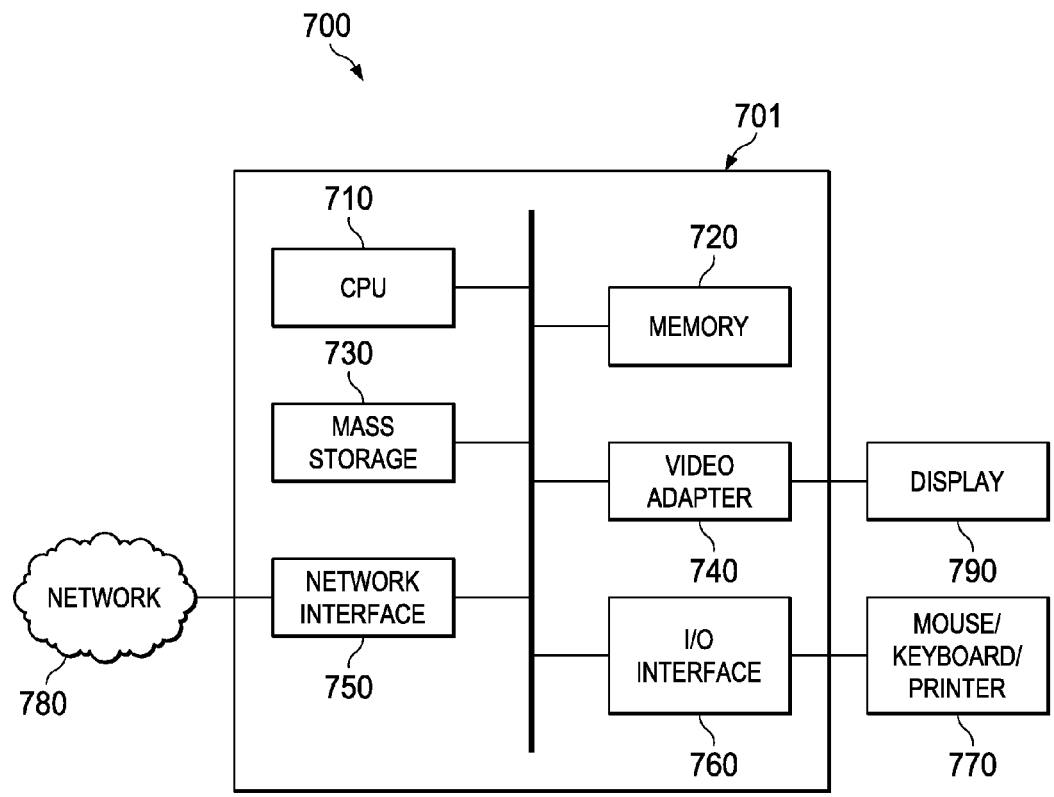
FIG. 7 is a block diagram of a processing system that can be used to implement various embodiments.

FIG. 7 is a block diagram of a processing system 700 that can be used to implement various embodiments. The processing system 700 can be part of a server, cloud platform hardware, or other network device. Specific devices utilize all of the components shown, or only a subset of the components, and levels of integration will vary from device to device. Furthermore, a device may contain multiple instances of a component, such as multiple processing units, processors, memories, transmitters, receivers, etc. In some embodiments, the processing system 700 has a processing unit 701 equipped with one or more input/output devices, such as a speaker, microphone, mouse, touchscreen, keypad, keyboard, printer, display, and the like. The processing unit 701 may include a central processing unit (CPU) 710 with one or more processors, a memory 720, a mass storage device 730, a video adapter 740, and an I/O interface 760 connected to a bus. The bus is one or more of any type of several bus architectures including a memory bus or memory controller, a peripheral bus, a video bus, or the like.

The CPU 710 may have any type of electronic data processor. The memory 720 may have, or be, any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs. In embodiments, the memory 720 is non-transitory. The mass storage device 730 includes any type of storage device that stores data, programs, and other information and to make the data, programs, and other information accessible via the bus. The mass storage device 730 includes, for example, one or more of a solid state drive, hard disk drive, a magnetic disk drive, an optical disk drive, or the like.

The video adapter 740 and the I/O interface 760 provide interfaces to couple external input and output devices to the processing unit. As illustrated, examples of input and output devices include a display 790 coupled to the video adapter 740 and any combination of mouse/keyboard/printer 770 coupled to the I/O interface 760. Other devices may be coupled to the processing unit 701, and additional or fewer interface cards may be utilized. For example, a serial interface card (not shown) may be used to provide a serial interface for a printer.

The processing unit 701 also includes one or more network interfaces 750, which includes wired links, such as an Ethernet cable or the like, and/or wireless links to access nodes or one or more networks 780. The network interface 750 allows the processing unit 701 to communicate with remote units via the networks 780. For example, the network interface 750 may provide wireless communication via one or more transmitters/transmit antennas and one or more receivers/receive antennas. In an embodiment, the processing unit 701 is coupled to a local-area network or a wide-area network for data processing and communications with remote devices, such as other processing units, the Internet, remote storage facilities, or the like.

An embodiment device includes a network interface configured to communicate with a network having a plurality of endpoints, a non-transitory computer readable medium having executable instructions thereon, and a processor coupled to the network interface and the computer readable medium. The executable instructions, when executed, cause the processor to receive an Intent representing requirements for data traffic on the network, with the Intent specifying one or more traffic parameters identifying one or more endpoints of the plurality of endpoints, and with the Intent further specifying at least one first service to be performed for data traffic satisfying the traffic parameters. The at least one first service is of one or more services registered as being provided by the network. The executable instructions also include instructions to generate one or more networking commands identifying the at least one first service according to the traffic parameters, send the one or more networking commands to one or more network devices on the network and cause the network devices to perform the at least one first service on a first data transmission in response to parameters of the data transmission satisfying the one or more networking commands.

In some embodiments, the one or more traffic parameters include one or more source traffic parameters and one or more destination traffic parameters, the one or more endpoints include one or more source endpoints and one or more destination endpoints, the one or more networking commands include one or more flow descriptors, and wherein parameters of the first data transmission satisfy the one or more flow descriptors when parameters of a source of the first data transmission and parameters of a destination of the first data transmission satisfy the one or more flow descriptors. In some embodiments, the one or more source traffic parameters include an Composite Endpoint Descriptor (CED) source identifier of a source CED, wherein the source CED has a first expression with a first flexible endpoint descriptor (FED) identifier of one or more FEDs used to at least partially identify at least one of the plurality of endpoints. The one or more destination traffic parameters include a CED destination identifier of a destination CED, wherein the destination CED has a second expression with a second FED identifier of one or more FEDs used to at least partially identify at least one of the plurality of endpoints. In some embodiments, the first expression is a Boolean expression having a Boolean operator operating on the first FED identifier and a third FED identifier of the one or more FEDs as Boolean operands. In some embodiments, at least one of the one or more FEDS identifies a data transmission parameter and one of a range of values or a group of values. In some embodiments, the executable instructions causing the processor to generate one or more flow descriptors include executable instructions that cause the processor to generate binary parse trees of the first expression and the second expression, generate tuples from the binary parse trees, validate the tuples, and generate the flow descriptors from the tuples. In some embodiments, the executable instructions further include instructions that, when executed, cause the processor to receive a FED request to create a first FED of the one or more FEDs, create, in a database, the first FED, receive a CED request to create the first CED, wherein the first CED has the identifier of the first FED in the first expression, and create, in the database, the first CED. In some embodiments, the at least one first service is for at least one of access control, service function chaining, quality of service (QoS) management, logging, and transmission steering.

An embodiment method includes receiving an Intent representing requirements for data traffic on a network having a plurality of endpoints, the Intent specifying one or more traffic parameters and one or more endpoints of the plurality of endpoints, the Intent further specifying at least one first service to be performed for data traffic satisfying the traffic parameters, wherein the at least one first service is of one or more services registered as being provided by the network. The method further includes generating one or more networking commands identifying the at least one first service according to the traffic parameters, sending the one or more networking commands to one or more network devices on the network and causing the network devices to perform the at least one first service on a first data transmission in response to parameters of the data transmission satisfying the one or more networking commands.

In an embodiment, the one or more traffic parameters include one or more source traffic parameters and one or more destination traffic parameters, the one or more endpoints include one or more source endpoints and one or more destination endpoints, the one or more networking commands include one or more flow descriptors, and parameters of the first data transmission satisfy the one or more flow descriptors when parameters of a source of the first data transmission and parameters of a destination of the first data transmission satisfy the one or more flow descriptors. In an embodiment, the one or more source traffic parameters include a Composite Endpoint Descriptor (CED) source identifier of a source CED, wherein the source CED has a first expression with a first flexible endpoint descriptor (FED) identifier of one or more FEDs used to at least partially identify at least one of the plurality of endpoints. In an embodiment, the one or more destination traffic parameters include a CED destination identifier of a destination CED, wherein the destination CED has a second expression with a second FED identifier of one or more FEDs used to at least partially identify at least one of the plurality of endpoints. In an embodiment, the first expression is a Boolean expression having a Boolean operator operating on the first FED identifier and a third FED identifier of the one or more FEDs as Boolean operands. In an embodiment, at least one of the one or more FEDS identifies a data transmission parameter and one of a range of values or a group of values. In an embodiment, the generating the one or more flow descriptors includes generating binary parse trees of the first expression and the second expression, generating tuples from the binary parse trees, validating the tuples, and generating the flow descriptors from the tuples. In an embodiment, the method further includes receiving a FED request to create a first FED of the one or more FEDs, creating, in a database, the first FED, receiving a CED request to create the first CED, wherein the first CED has the identifier of the first FED in the first expression, and creating, in the database, the first CED. In an embodiment, the at least one first service is for at least one of access control, service function chaining, quality of service (QoS) management, logging, and transmission steering.

An embodiment method includes receiving one or more Intent parameters at a client application and sending, by the client application to an Intent server on a network having a plurality of endpoints, a request to create an Intent for processing data flows by network devices on the network, the Intent representing requirements for data traffic on the network. The Intent specifies one or more traffic parameters and further specifies at least one first service to be performed for data traffic satisfying the traffic parameters, and the at least one first service is of one or more services registered as being provided by the network. The method may further include transmitting a data flow to the network devices so that the Intent is applied to the data flow.

In an embodiment, the at least one first service for at least one of access control, service function chaining, quality of service (QoS) management, logging, and transmission steering. In an embodiment, the one or more traffic parameters include a CED source identifier of a source Composite Endpoint Descriptor (CED), and the source CED has a first expression with a first flexible endpoint descriptor (FED) identifier of one or more FEDs used to at least partially identify at least one of the plurality of endpoints. In an embodiment, the one or more traffic parameters further include a CED destination identifier of a destination CED, and the destination CED has a second expression with a second FED identifier of one or more FEDs used to at least partially identify at least one of the plurality of endpoints. In an embodiment, the first expression is a Boolean expression having a first Boolean operator operating on at least the first FED identifier as a Boolean operand, and the second expression is a Boolean expression having a second Boolean operator operating on at least the second FED identifier as a Boolean operand. In an embodiment, each of the FEDs identifies a parameter of data transmissions and one of a range of values or a group of values.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

It is therefore intended that the appended claims encompass any such modifications or embodiments.

What is claimed is:

1. A device comprising:
    a network interface configured to communicate with a network having a plurality of endpoints;
    a non-transitory computer-readable medium having executable instructions thereon; and
    a processor coupled to the network interface and the computer-readable medium, wherein the processor executes the executable instructions to:
        receive a representation of requirements for data traffic on the network, the representation comprising:
            traffic parameters that include:
                a Composite Endpoint Descriptor (CED) source identifier of a source CED for a source endpoint of the plurality of endpoints, the source CED having a first expression with a first flexible endpoint descriptor (FED) identifier of a first FED of the source CED, the first expression being a Boolean expression having a Boolean operator operating on the first FED identifier and a second FED identifier of a second FED of the source CED as Boolean operands, the first FED and the second FED each comprising a type, an FED operator, and a value that is used to partially identify the source endpoint; and
                a CED destination identifier of a destination CED for a destination endpoint of the plurality of endpoints, the destination CED having a second expression with a third FED identifier of a third FED of the destination CED; and
            an identification of at least one first service for data traffic associated with the traffic parameters;
        generate binary parse trees of the first expression and the second expression;
        generate tuples from the binary parse trees;
        validate the tuples;
        generate one or more flow descriptors from the tuples, each of the one or more flow descriptors comprising the CED source identifier and the CED destination identifier, wherein at least one flow descriptor of the one or more flow descriptors is associated with the at least one first service;
        generate one or more networking commands identifying the at least one first service, the one or more networking commands comprising the one or more flow descriptors; and
        send the one or more networking commands to one or more network devices on the network to cause the one or more network devices to perform the at least one first service on a first data transmission according to parameters of the first data transmission.

2. The device of claim 1, wherein the parameters of the first data transmission comprise one or more parameters of a source of the first data transmission and one or more parameters of a destination of the first data transmission.

3. The device of claim 1, wherein the representation comprises an identification of a plurality of services for a service chain for data traffic associated with the traffic parameters, the at least one first service being a part of the plurality of services for the service chain.

4. The device of claim 1, wherein the second expression is a second Boolean expression having a second Boolean operator operating on the third FED identifier and a fourth FED identifier of a fourth FED of the destination CED as second Boolean operands.

5. The device of claim 1, wherein at least one of the FEDs of the source CED identifies a data transmission parameter and one of a range of values or a group of values.

6. The device of claim 1, wherein the processor further executes the executable instructions to:
    receive an FED request to create the first FED of the source CED;
    create, in a database, the first FED;
    receive a CED request to create the source CED, wherein the source CED has the first FED identifier of the first FED in the first expression; and
    create, in the database, the source CED.

7. The device of claim 1, wherein the at least one first service is for at least one of access control, service function chaining, quality of service (QoS) management, logging, and transmission steering.

8. The device of claim 1, wherein:
    the first expression of the source CED and the second expression of the destination CED are text strings; and
    the executable instructions causing the processor to generate one or more flow descriptors include executable instructions that cause the processor to:
        convert the text strings of the first expression and the second expression to reverse polish notation (RPN) expressions; and
        generate, from the RPN expressions of the first expression and the second expression, the binary parse trees of the first expression and the second expression.

9. The device of claim 1, wherein the first expression of the source CED comprises a second CED identifier of a second CED, the second CED being different than the source CED and the destination CED, the second CED having a third expression with a fourth FED of the second CED.

10. The device of claim 1, wherein the value of the first FED comprises a single value, a range of values, or a group of values.

11. A method comprising:
    receiving a representation of requirements for data traffic on a network having a plurality of endpoints, the representation comprising:
        traffic parameters that include:
            a Composite Endpoint Descriptor (CED) source identifier of a source CED for a source endpoint of the plurality of endpoints, the source CED having a first expression with a first flexible endpoint descriptor (FED) identifier of a first FED of the source CED, the first expression being a Boolean expression having a Boolean operator operating on the first FED identifier and a second FED identifier of a second FED of the source CED as Boolean operands, the first FED and the second FED each comprising a type, an FED operator, and a value that is used to partially identify the source endpoint; and
            a CED destination identifier of a destination CED for a destination endpoint of the plurality of endpoints, the destination CED having a second expression with a third FED identifier of a third FED of the destination CED; and
        an identification of at least one first service for data traffic associated with the traffic parameters;
    generating binary parse trees of the first expression and the second expression;
    generating tuples from the binary parse trees;
    validating the tuples;

generating one or more flow descriptors from the tuples, each of the one or more flow descriptors comprising the CED source identifier and the CED destination identifier, at least one flow descriptor of the one or more flow descriptors being associated with the at least one first service;

generating one or more networking commands identifying the at least one first service, the one or more networking commands comprising the one or more flow descriptors; and sending the one or more networking commands to one or more network devices on the network to cause the one or more network devices to perform the at least one first service on a first data transmission according to parameters of the first data transmission.

12. The method of claim 11, wherein the parameters of the first data transmission comprise one or more parameters of a source of the first data transmission and one or more parameters of a destination of the first data transmission.

13. The method of claim 11, wherein the representation comprises an identification of a plurality of services for a service chain for data traffic associated with the traffic parameters, the at least one first service being a part of the plurality of services for the service chain.

14. The method of claim 11, wherein the second expression is a second Boolean expression having a second Boolean operator operating on the third FED identifier and a fourth FED identifier of a fourth FED of the destination CED as second Boolean operands.

15. The method of claim 11, wherein at least one of the FEDs of the source CED identifies a data transmission parameter and one of a range of values or a group of values.

16. The method of claim 11, further comprising:
receiving an FED request to create the first FED of the source CED;
creating, in a database, the first FED;
receiving a CED request to create the source CED, wherein the source CED has the first FED identifier in the first expression; and
creating, in the database, the source CED.

17. The method of claim 11, wherein the at least one first service is for at least one of access control, service function chaining, quality of service (QoS) management, logging, and transmission steering.

18. A method, comprising:
receiving, at a client application, one or more parameters;
sending, by the client application to a server on a network having a plurality of endpoints, a request to create a representation of requirements for data traffic on the network, the representation for processing data flows by network devices on the network, the representation comprising:
traffic parameters that include:
a Composite Endpoint Descriptor (CED) source identifier of a source CED for a source endpoint of the plurality of endpoints, the source CED having a first expression with a first flexible endpoint descriptor (FED) identifier of a first FED of the source CED, the first expression being a Boolean expression having a Boolean operator operating on the first FED identifier and a second FED identifier of a second FED of the source CED as Boolean operands, the first FED and the second FED each comprising a type, an FED operator, and a value that is used to partially identify the source endpoint; and
a CED destination identifier of a destination CED for a destination endpoint of the plurality of endpoints, the destination CED having a second expression with a third FED identifier of a third FED of the destination CED; and
an identification of a plurality of services for a service chain for data traffic associated with the traffic parameters; and
transmitting a data flow to the network devices so that the representation of the requirements is applied to the data flow, the network devices receiving, from the server, one or more networking commands identifying at least one first service associated with one or more flow descriptors, each of the one or more flow descriptors comprising the CED source identifier and the CED destination identifier, the server generating the one or more flow descriptors by:
generating binary parse trees of the first expression and the second expression;
generating tuples from the binary parse trees;
validating the tuples; and
generating the one or more flow descriptors from the tuples.

19. The method of claim 18, wherein the plurality of services comprises one or more of access control, service function chaining, quality of service (QoS) management, logging, and transmission steering.

20. The method of claim 18, wherein the second expression is a second Boolean expression having a second Boolean operator operating on at least the third FED identifier as a second Boolean operand.

21. The method of claim 18, wherein each of the FEDs identifies a parameter of data transmissions and one of a range of values or a group of values.

* * * * *